United States Patent
Cole et al.

(10) Patent No.: US 10,638,181 B2
(45) Date of Patent: Apr. 28, 2020

(54) NON-LINEAR C3 CONTENT SCHEDULING AND ENCODING SYSTEM

(71) Applicant: SCRIPPS NETWORKS INTERACTIVE, INC., Knoxville, TN (US)

(72) Inventors: Graham Cole, Knoxville, TN (US); Kevin Barry, Knoxville, TN (US); Michael Donovan, Knoxville, TN (US); Tim Harty, Knoxville, TN (US)

(73) Assignee: SCRIPPS NETWORKS INTERACTIVE, INC., Knoxville, TN (US)

( * ) Notice: Subject to any disclaimer, the term of this patent is extended or adjusted under 35 U.S.C. 154(b) by 0 days.

(21) Appl. No.: 15/628,150

(22) Filed: Jun. 20, 2017

(65) Prior Publication Data

US 2018/0131986 A1 May 10, 2018

Related U.S. Application Data

(60) Provisional application No. 62/352,054, filed on Jun. 20, 2016.

(51) Int. Cl.
*H04N 5/445* (2011.01)
*H04N 21/262* (2011.01)
(Continued)

(52) U.S. Cl.
CPC ............... *H04N 21/26266* (2013.01); *H04N 21/234309* (2013.01); *H04N 21/812* (2013.01); *H04N 21/8456* (2013.01); *H04N 21/8543* (2013.01)

(58) Field of Classification Search
CPC .......... H04N 21/8456; H04N 21/8543; H04N 21/812; H04N 21/234309; H04N 21/26266
See application file for complete search history.

(56) References Cited

U.S. PATENT DOCUMENTS 8,621,508 B2   12/2013   Rowe et al.
8,843,966 B2   9/2014    Seldin et al.
(Continued)

OTHER PUBLICATIONS

SeaChange "A Digital Television History" Company's Profile, accessed on Nov. 23, 2015.
(Continued)

*Primary Examiner* — Pankaj Kumar
*Assistant Examiner* — Sahar Aqil Riaz
(74) *Attorney, Agent, or Firm* — J.A. Lindeman & Co. PLLC

(57) ABSTRACT

The non-linear content scheduling and encoding (recording) system provides a highly automated file-based video-on-demand (VOD) publishing workflow. The system includes content-provider scheduling and broadcast programming for encoding, editing, and distribution of video assets (e.g., episodes). The invention effectively scales VOD production and allows broadcasters to use the same schedule and sources as their traditional playout operation to quickly and efficiently produce VOD deliverables with all the correct metadata. The systems of the invention process content at significantly faster rates than traditional, real-time VOD generation. The systems provide program management and incorporate traffic system ad components within fully integrated VOD publishing. The systems enable automatic retrieval of sources for VOD generation from generic storage, video servers, non-linear editing systems, archiving systems, content delivery systems, data or video tapes, as well as from live video sources.

23 Claims, 11 Drawing Sheets

(51) Int. Cl.
*H04N 21/2343* (2011.01)
*H04N 21/81* (2011.01)
*H04N 21/8543* (2011.01)
*H04N 21/845* (2011.01)

(56) References Cited

U.S. PATENT DOCUMENTS

| | | | |
|---|---|---|---|
| 8,856,814 B2 | 10/2014 | Parekh et al. | |
| 8,869,207 B1 | 10/2014 | Earle | |
| 8,880,733 B2 | 11/2014 | Stasi et al. | |
| 8,925,001 B2 | 12/2014 | Morris et al. | |
| 9,154,852 B2 | 10/2015 | Huber et al. | |
| 10,425,453 B2 * | 9/2019 | Navali | H04L 65/4084 |
| 10,448,065 B2 * | 10/2019 | Barkley | H04N 21/23424 |
| 10,466,991 B1 * | 11/2019 | Hussain | G06F 8/61 |
| 10,506,262 B2 * | 12/2019 | Ma | H04N 21/2183 |
| 2008/0133311 A1 | 6/2008 | Madriz Ottolina | |
| 2009/0204615 A1 | 8/2009 | Samame et al. | |
| 2011/0296474 A1 * | 12/2011 | Babic | H04N 21/21 725/87 |
| 2013/0205330 A1 | 8/2013 | Sinha et al. | |
| 2013/0347034 A1 * | 12/2013 | Kazmier | H04N 21/812 725/34 |
| 2014/0115180 A1 | 4/2014 | De Medeiros et al. | |
| 2014/0237498 A1 | 8/2014 | Ivins | |
| 2015/0348091 A1 | 12/2015 | Haberman et al. | |
| 2016/0249092 A1 * | 8/2016 | Hasek, IV | H04N 21/4334 |
| 2016/0337704 A1 * | 11/2016 | Binder | H04N 21/4826 |
| 2017/0289639 A1 * | 10/2017 | Reisner | H04N 21/4882 |
| 2017/0332114 A1 * | 11/2017 | Turgut | H04L 65/1069 |
| 2019/0327505 A1 * | 10/2019 | Schwimmer | H04N 21/2393 |

OTHER PUBLICATIONS

SyncTV Platform, How it Works, SyncTV Corporation, 2014, accessed on Nov. 23, 2015.

* cited by examiner

Scripps Networks Interactive - Sample C3 Invention XML

```xml
<?xml version="1.0" encoding="UTF-8"?><ADI>
    <Metadata>
        <!--Package Info-->
        <AMS Asset_Class="package" Asset_ID="HDHG0079840002563831"
Asset_Name="0256383_Singapore_Swap_HDP" Creation_Date="2016-06-10"
Description="Singapore Swap HD--package--" Product="MOD" Provider="HGTV_HD"
Provider_ID="hgtv.com" Version_Major="1" Version_Minor="0"/>
        <App_Data App="MOD" Name="Metadata_Spec_Version" Value="CableLabsVO1.1"/>
        <App_Data App="MOD" Name="Provider_Content_Tier" Value="SNI_C3D4_LRG_HD"/>
    </Metadata>
    <Asset>
        <!--Title Info-->
        <Metadata>
            <AMS Asset_Class="title" Asset_ID="HDHG0079840002563832"
Asset_Name="0256383_Singapore_Swap_HDT" Creation_Date="2016-06-10"
Description="Singapore Swap HD--title--" Product="MOD" Provider="HGTV_HD"
Provider_ID="hgtv.com" Version_Major="1" Version_Minor="0"/>
            <App_Data App="MOD" Name="Title_Brief" Value="Singapore Swap HD"/>
            <App_Data App="MOD" Name="Title_Brief_SD" Value="Singapore Swap"/>
            <App_Data App="MOD" Name="Episode_Name" Value="Singapore Swap"/>
            <App_Data App="MOD" Name="Nonlinear_ID" Value="0256383"/>
            <App_Data App="MOD" Name="Priority" Value="Normal"/>
            <App_Data App="MOD" Name="Authenticated" Value="Y"/>
            <App_Data App="MOD" Name="Closed_Captioning" Value="Y"/>
            <App_Data App="MOD" Name="Title" Value="Singapore Swap"/>
            <App_Data App="MOD" Name="Title_SD" Value="Singapore Swap"/>
            <App_Data App="MOD" Name="Type" Value="title"/>
            <App_Data App="MOD" Name="Summary_Short" Value="A couple and their sons
move to Singapore for a job opportunity. The couple is swapping roles for the first
time in years, so their agent must find a place that suits their new needs in one of
the world's most expensive cities."/>
            <App_Data App="MOD" Name="Rating" Value="TV-G"/>
            <App_Data App="MOD" Name="Run_Time" Value="00:21:32"/>
            <App_Data App="MOD" Name="Display_Run_Time" Value="00:22"/>
            <App_Data App="MOD" Name="Year" Value="2017"/>
            <App_Data App="MOD" Name="Studio" Value="Home and Garden Television"/>
            <App_Data App="MOD" Name="Category" Value="Life & Home/HGTV/House
Hunts Intl HD"/>
            <App_Data App="MOD" Name="Category" Value="TV Shows/Shows G-I HD/House
Hunters Intl/Currently Airing"/>
            <App_Data App="MOD" Name="Category" Value="TV Shows/By
Network/HGTV/House Hunts Intl HD"/>
            <App_Data App="MOD" Name="Category_SD" Value="Life & Home/HGTV/House
Hunters Intl"/>
            <App_Data App="MOD" Name="Category_SD" Value="TV Shows/By
Network/HGTV/House Hunters Intl"/>
            <App_Data App="MOD" Name="Category_SD" Value="TV Shows/Shows G-I/House
Hunters Intl/Currently Airing"/>
            <App_Data App="MOD" Name="Genre" Value="Family"/>
            <App_Data App="MOD" Name="Billing_ID" Value="00000"/>
            <App_Data App="MOD" Name="Maximum_Viewing_Length" Value="01:00:00"/>
            <App_Data App="MOD" Name="Licensing_Window_Start" Value="2017-06-16"/>
            <App_Data App="MOD" Name="Licensing_Window_End" Value="2017-08-22"/>
            <App_Data App="MOD" Name="Provider_QA_Contact" Value="Leslie
Podrasky"/>
```

FIG. 6A

```
        <App_Data App="MOD" Name="Contract_Name" Value="Scripps Networks"/>
        <App_Data App="MOD" Name="Suggested_Price" Value="0.00"/>
        <App_Data App="MOD" Name="Studio_Royalty_Percent" Value="0"/>
        <App_Data App="MOD" Name="Studio_Royalty_Minimum" Value="0"/>
        <App_Data App="MOD" Name="Studio_Royalty_Flat_Rate" Value="0"/>
        <App_Data App="MOD" Name="Studio_Name" Value="Home and Garden
Television"/>
        <App_Data App="MOD" Name="Preview_Period" Value="180"/>
        <App_Data App="MOD" Name="Distributor_Name" Value="CMC"/>
        <App_Data App="MOD" Name="Programmer_Call_Letters" Value="HGTVHD"/>
        <App_Data App="MOD" Name="Recording_Start_Primary"           ← 905
Value="2017-06-18T22:30:00"/>
        <App_Data App="MOD" Name="Recording_End_Primary"              ← 910
Value="2017-06-18T23:00:00"/>
        <App_Data App="MOD" Name="Recording_Start_Alternate"          ← 915
Value="2017-06-18T01:30:00"/>
        <App_Data App="MOD" Name="Recording_End_Alternate"            ← 920
Value="2017-06-18T02:00:00"/>
        <App_Data App="MOD" Name="Recording_Channel" Value="HGTV"/>   ← 925
        <App_Data App="MOD" Name="Title_30" Value="Singapore Swap"/>
        <App_Data App="MOD" Name="Summary_80" Value="A husband and wife swap
roles for a job opportunity in Singapore."/>
        <App_Data App="MOD" Name="Series_Name" Value="House Hunters  ← 940
International"/>
        <App_Data App="MOD" Name="Series_ID" Value="SH008046630000"/>
        <App_Data App="MOD" Name="Episode_Number" Value="10510"/>
        <App_Data App="MOD" Name="Season_Number" Value="10500"/>
        <App_Data App="MOD" Name="ChapterStartTime"
Value="00:07:44,00:12:35,00:17:46"/>
        <App_Data App="MOD" Name="Keywords" Value="singapore, home buying,
single family house, real estate, living abroad, house hunters international, hgtv"/>
        <App_Data App="MOD" Name="Asset_Type" Value="episode"/>
        <App_Data App="MOD" Name="Show_Abbr" Value="HHINT"/>
        <App_Data App="MOD" Name="House_ID" Value="3349968"/>
        <App_Data App="MOD" Name="Sync_Link"                          ← 935
Value="http://www.hgtv.com/shows/house-hunters-international"/>
        <App_Data App="MOD" Name="Sync_Text" Value="Get more HHI"/>
        <App_Data App="MOD" Name="aMIGUID"
Value="0fe1b993-f000-471f-b039-f2befdbb615f"/>
        <App_Data App="MOD" Name="seriesSynopsis_full" Value="This spin-off of
the wildly popular HGTV House Hunters goes around the globe. Home hunters and their
realtors check out all sorts of architectural styles and work through the quirks of
buying real estate in other countries."/>
        <App_Data App="MOD" Name="contentOwnerTitleID" Value="0256383"/>
        <App_Data App="MOD" Name="contentOwnerAlphaID" Value="0256383"/>
        <App_Data App="MOD" Name="clippable" Value="true"/>
        <App_Data App="MOD" Name="castable" Value="false"/>
        <App_Data App="MOD" Name="browser_playback" Value="false"/>
        <App_Data App="MOD" Name="tags" Value="singapore, home buying, single
family house, real estate, living abroad, house hunters international, hgtv"/>
    </Metadata>
    <Asset>
        <!--Movie Info-->
        <Metadata>
            <AMS Asset_Class="movie" Asset_ID="HDHX0079840000043833"     ← 930
Asset_Name="0256383_Singapore_Swap_HDM" Creation_Date="2016-06-10"
Description="Singapore Swap HD--movie--" Product="MOD" Provider="HGTV_HD"
```

```xml
<!--Still-Image Info-->
<Metadata>
    <AMS Asset_Class="poster" Asset_ID="HDHG0079840002563834" Asset_Name="0256383_Singapore_Swap_HDS" Creation_Date="2016-06-10" Description="Singapore Swap HD--img--" Product="MOD" Provider="HGTV_HD" Provider_ID="hgtv.com" Version_Major="1" Version_Minor="0"/>
    <App_Data App="MOD" Name="Type" Value="poster_210x280"/>
    <App_Data App="MOD" Name="Content_FileSize" Value="109599"/>
    <App_Data App="MOD" Name="Content_CheckSum" Value="589f3be6332199428bd01054dff2160b"/>
    <App_Data App="MOD" Name="HDContent" Value="Y"/>
</Metadata>
<Content Value="0256383_210x280.jpg"/>
</Asset>
<Asset>
<!--Still-Image Info-->
<Metadata>
    <AMS Asset_Class="poster" Asset_ID="HDHG0079840002563834" Asset_Name="0256383_Singapore_Swap_HDS" Creation_Date="2016-06-10" Description="Singapore Swap HD--bmp--" Product="MOD" Provider="HGTV_HD" Provider_ID="hgtv.com" Version_Major="1" Version_Minor="0"/>
    <App_Data App="MOD" Name="Type" Value="poster"/>
    <App_Data App="MOD" Name="Content_FileSize" Value="4665654"/>
    <App_Data App="MOD" Name="Content_CheckSum" Value="dbea573f07383b3458c96f82f623bd8d"/>
</Metadata>
<Content Value="0256383_1440x1080.bmp"/>
</Asset>
</Asset>
</ADI>
```

FIG. 6D

NON-LINEAR C3 CONTENT SCHEDULING AND ENCODING SYSTEM

CROSS REFERENCE TO RELATED APPLICATIONS

This application claims the benefit of priority of U.S. Provisional Application No. 62/352,054 filed on Jun. 20, 2016. This application incorporates by reference the entire contents of U.S. Provisional Application No. 62/352,054 filed on Jun. 20, 2016.

TECHNICAL FIELD

This technology relates to media asset management. More specifically, the technology relates to media content scheduling, encoding, and delivering non-linear video content to distribution partners for viewing on digital media players across many platforms.

BACKGROUND

Home entertainment continues to evolve, and consumption of movies and television content beyond the traditional TV set-top box is no longer a novelty. Video service and content providers continue to expand content offerings and capabilities across devices and screens to attract and retain viewers. Generating on-line and on-demand content consumes many provider resources, while often generating low revenue streams compared to traditional, linear television programming. The low efficiency of on-demand and on-line content generation in traditional systems resulted from very separate workflow for nonlinear content and traditional television. Many broadcasters and content providers operate their playout (transmission of content from the broadcaster into cable networks, broadcast networks, and satellite networks that deliver the content to the audience) and new media (on-demand/online) operations independently. In the past, this approach worked when there were only a few media platforms, but has failed as the volume of on-demand content grew dramatically, with the upsurge of new formats, including cable and satellite video-on-demand (VOD) distribution, owned and syndicated web delivery, mobile device services and DTO/DTR (Download to Own/Rent) media portals.

Multichannel Video Programming Distributors (MVPD) have embraced VOD growth with TV Everywhere, TV Anywhere, TV Anytime, and Catch-Up TV initiatives. These ventures have sought to retain viewers, and maintain revenues, by allowing their audiences to watch their favorite programs through their preferred medium, and at a time that best suits them. Unfortunately, all this growth in VOD content resulted in an overloading of broadcasters' existing on-demand content generation processes.

SUMMARY

The overload of VOD has forced content providers to rethink operations to reduce the latency between the release of "just aired" VOD content and the actual playout of their schedule. This has changed the focus of VOD operations from back-catalog publishing, to schedule content publishing, which calls for closer collaboration between playout and new media operations. This is especially true now that many broadcasters have contractual agreements with advertisers to include original advertisements in some VOD deliverables, such as Nielsen-measured C3 cable VOD in the U.S. market.

The monetization of VOD content to offset the related operational costs affects pay-per-view, subscription-based, and advertising-supported business models. Previously, most broadcasters needed to produce separate content to support each of these approaches. In addition, conflicts exist regarding the merits of mass advertising versus targeted advertising, which leads to further requirements to embed advertising in VOD products, and/or to provide ad insertion instructions (XML, SCTE, EBIF) for targeted advertising. Consequently, each of these various VOD products must be customized to meet individual distribution contract agreements, and this often results in dozens of extra versions.

To address demanding VOD issues, the claimed invention provides a smarter, file-based VOD publishing workflow and a much higher level of process automation. The invention allows effective scaling of VOD production, with faster than real-time production. The invention allows broadcasters to use the same schedule and sources as their traditional playout operation to quickly and efficiently produce VOD deliverables with all the correct metadata. The systems of the invention process content at significantly faster rates than traditional, real-time VOD generation. The invention provides program management and incorporates traffic system ad components within the fully integrated VOD publishing. The invention enables automatic retrieval of sources for VOD generation from generic storage, video servers, non-linear editing systems, archiving systems, content delivery systems, data or video tapes, as well as from live video sources.

The claimed invention is a video encoding (recording) system that includes content-provider scheduling and broadcast programming for encoding, editing, and distribution of video assets (e.g., episodes). Often, the received programming (e.g., video assets as source video files) is edited and prepared by a third party for distribution to the content-provider's partners and properties as C3 and D4+ content based on preparation of the source file by the content provider. Content that includes the full advertising load during the first three (3) days after the original broadcast airdate is termed "C3 content," while other versions of the online asset with a reduced advertising load via dynamic ad insertion (DAI) accessed by viewers four days or later from the broadcast schedule airdate is termed "D4+ content." The video scheduling and encoding system provides C3 and D4+ content with technical specifications used downstream to generate advertising revenue. At some points in the workflow, the video processing systems used to edit, prepare, and distribute the video assets are a part of a third-party's platform, while in other configurations, the video processing systems used to edit, prepare, and distribute the video assets are a part of the content provider system or a part of other platforms. In the examples below, the video processing system is described as a "third-party" video processing system for clarity and to show breaks in the overall workflow.

The invention includes a non-linear video content scheduling and encoding system. The system includes a program scheduling application (PSA) unit that creates a manifest. The manifest is a file that includes a linear broadcast feed recording schedule, a filename of a scheduled linear broadcast feed, a location(s) of a still image(s) associated with the broadcast, broadcast feed capture information, network routing information of the linear broadcast feed, and other artifacts used to identify linear broadcast feeds to be recorded and delivered to distribution partners as non-linear video assets for viewing on a variety of platforms. The manifest can be in the form of an XML file or other files that convey transportation, structure, storage, and other data/information attributes. The system sends portions of the manifest to an ingest server in a video processing system. In some example systems of the invention, the manifest is an XML file, such as a metadata file based on the CableLabs Specification 1.1, as one example.

The system also includes a schedule controller server that receives encoding (recording) details from the video processing system to facilitate the encoding of the linear broadcast feed. Further, the system includes an encoding server that receives the linear broadcast feed and encodes the linear broadcast feed into an intermediate bit rate file and sends the intermediate bit rate file to the video processing system as non-linear video content. The intermediate bit rate file includes technical specifications used to view the non-linear video content on multiple viewing platforms. In some example systems of the invention, the video file (that is, the intermediate bit rate file—IBR) includes closed captioning data and/or advertisements. In some of the systems of the invention, the program scheduling application unit publishes portions of the manifest (e.g., XML file) prior to encoding the linear video (broadcast feed).

The non-linear video content can be viewed on multiple viewing platforms, including multichannel video programming distributors (MVPDs) and online video platforms such as websites and mobile apps.

The system can also include an audience measurement unit that counts viewers of C3 non-linear video content and/or D4+ non-linear video content prepared from the intermediate bitrate file sent to the video processing system. The audience measurement unit can measure the number of people in an audience as well as who is in the audience. The measurement unit can determine audience measurements using interviews, diaries, meters, scanning, modelling, and other measurement methodologies, such as those used by Nielsen Media Research, Kantar Media Network, Numeris, NLogic, TruMedia, CognoVision, Stratacache, and other audience measurement companies.

The encoded linear broadcast feed (intermediate bitrate file) can include watermarking for advertisements. The watermarks denote advertising insertion points of the non-linear video content (C3 and D4+) prepared from the intermediate bitrate file sent to the video processing system. The IBR watermarking for ad insertion points can be audio watermarks, for example.

The system of the invention can simultaneously schedule and encode multiple linear broadcast feeds. For example, one example non-linear content scheduling and encoding system includes a Program Scheduling (PSA) that creates multiple manifests for multiple linear broadcast feeds and sends them to the ingest server in the video processing system. In the content provider system, a schedule controller receives multiple linear video asset identifiers, multiple encoding start times (of the multiple linear broadcast feeds), and multiple encoding stop times (of the multiple linear broadcast feeds) from the video processing system. Using this information, the encoding server of the system receives the multiple linear broadcast feeds and encodes the multiple linear broadcast feeds to respective intermediate bit rate files and sends the respective intermediate bit rate files to the video processing system.

In some example systems of the invention, the system includes a frame grab service that selects a still image or still images based upon the image location(s) identified in the metadata file (i.e., manifest).

The non-linear content scheduling and encoding system can also include a distribution service that processes the manifest (e.g., the XML metadata file) provided by the Program Scheduling Application and modifies the manifest to provide a new manifest that includes content, encoding, and distribution information for the specific programs (i.e., the specific linear broadcast feeds), the specific versions of the programs, the specific distribution partners, and the specific viewing platforms slated to receive the non-linear video content. The new manifest can also be in the form of a metadata file (XML file).

The system can also include a messaging server that provides status of the workflow. For example, the messaging server can provide status of the scheduling and encoding of the linear video asset to an enterprise distribution service and can display the status in an operator dashboard.

Likewise, the system can also include an enterprise distribution server that receives events and incorporates them into the asset materials. For example, the enterprise distribution server receives customized metadata files, retrieves a still image based on the still image location, transforms the image based upon the multiple viewing platforms, and provides the encoded linear broadcast feed to a file transfer service for distribution.

The system can also include a file transfer service that receives events and incorporates them into the asset materials. For example, the file transfer server receives the new manifest (XML file) including the recording schedule, filename, still image information, capture information, routing information, and other artifacts from the Program Scheduling Application. The file transfer server sends the new manifest to the video processing system. Down the road, when the system encodes the linear broadcast, the file transfer server receives the intermediate bit rate file from the encoding server and transfers the intermediate bit rate file to the video processing system. The video processing system can then bring together the information from the new manifest and the intermediate bit rate file for distribution.

In some example systems, an ingest server in the video processing system receives the manifest and schedules the encoding of the linear broadcast feed. The video processing system also ingests the intermediate bit rate file and can trim the intermediate bit rate file to correct start and stop times of the encoded broadcast/non-linear video asset.

The video processing system creates a C3 version of the video asset by transcoding the intermediate bit rate (IBR) file. The new manifest (i.e., the XML metadata file) provides the information necessary for the transcoding of the IBR file to create the proper C3 versions of the non-linear video asset. Similarly, the system also ingests and creates a D4+ version of the video asset by transcoding the intermediate bit rate (IBR) file using information in the new manifest (i.e., the XML metadata file). The XML file also provides a basis for insertion of advertisements and/or branding information in the different versions of the non-linear video asset.

The system can also include an online video platform service that receives confirmation of delivery of the C3 and D4+ versions of the non-linear video asset to viewing platforms.

The video processing system can include a content management system (CMS) that receives a single manifest with a single set of artifacts and transforms the single set of artifacts into a plurality of sets of artifacts using a one-tomany conversion. The video processing system can then distribute each of the plurality of artifacts to individual distribution partners based upon the one-to-many conversion.

BRIEF DESCRIPTION OF THE DRAWINGS

FIGS. 6A-6D shows an example metadata file of the invention in an XML format.

DETAILED DESCRIPTION

Figure 1:
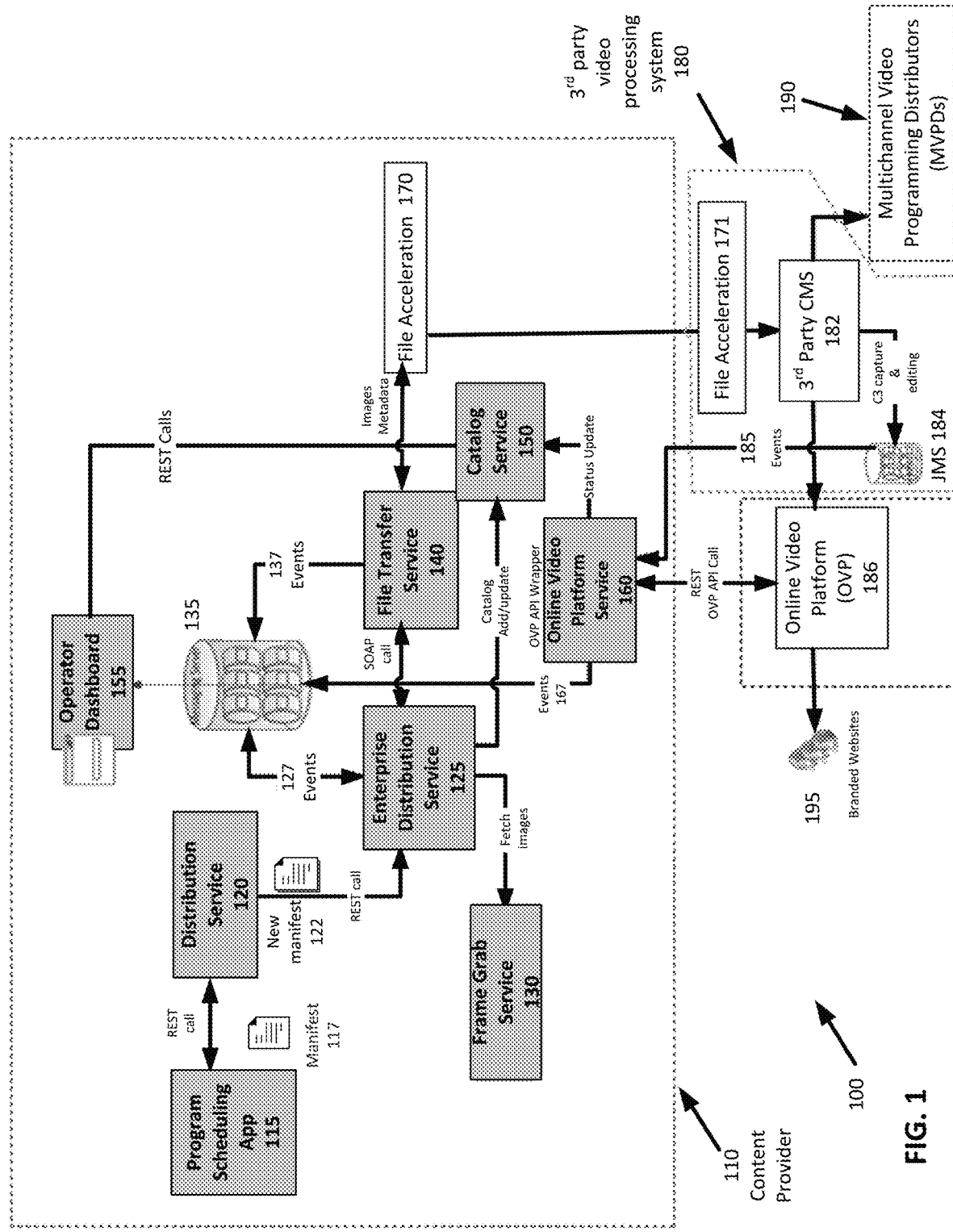
FIG. 1 shows a C3 distribution system architecture in accordance with the invention.

The invention creates advertising-loaded content, including viewed video files (such as a television show, for example) that are consumed on televisions as well as non-traditional viewing platforms, such as mobile phones, tablets, Internet browsers, set-top boxes, connected TV devices (e.g., AppleTV, Roku, Amazon Fire TV, Android TV, etc.), and other devices. The ability to measure and account for the viewing of these videos means that content providers of the videos can generate advertising dollars that are typically calculated based on numbers of viewers and other audience measures used by audience measurement systems (e.g., Nielsen Company, etc.) to determine audience size and composition of programs. The system creates video content with unique technical specifications for Web/Internet/online/multi-screen-based, linear, video-on-demand (VOD), and TV-Everywhere formats used downstream in the distribution process to generate advertising revenue. The system dynamically provisions the content to be delivered.

The invention encodes (i.e., records) a live television feed and uses that same content (i.e., a source video file) for distribution/consumption on other viewing platforms. The invention enables the tracking of video on demand (VOD) consumption on the other platforms and uses the audience Nielsen measurements to recoup advertising dollars. The system monitors end-users to ensure that end-to-end delivery and timing commitments are met. Previously, linear audience ratings (and therefore revenue) were driven by viewers watching the broadcast content of the television feed. The invention extends the ratings to non-linear viewing (that is, viewing of the show on devices at other times than during the television feed). This extends the ability of advertisers to count viewers up to 3 days after the original television feed, as permitted under advertising industry practices. 3 days is the time during which an advertiser can get confirmation that their advertisement was viewed, regardless of the manner in which it was viewed. This time frame is often referred to as the C3 window, and the content viewed during the C3 window is referred to as C3 content.

The invention allows the content-provider to monetize (via Nielsen ratings) the consumption of video on non-traditional platforms.

The delivered content (i.e., source files) to-be-ingested by third-party video processing services includes a variety of video and audio formats including metadata, advertisements, still images, and packaged content such as the CableLabs VOD, MRSS (Media RSS) content, and other web standard files.

The scheduling and encoding system of the invention sends the new manifest (as metadata in standard ADI format—asset distribution interface packages) to the third-party video processing services. In addition to the video and audio files, the package of metadata (e.g., XML file) also includes locations of still images, the filename of the scheduled program, capture date/time information, network name, and routing information. The file (new manifest) is automatically matched up to the package once the capture and ingest occurs.

The system encodes and delivers a program with advertisements (i.e. 30 sec. and 60 sec. ads) along with markers used to create a D4 version (i.e., a derivative file) of the program with program and advertising segments. The encoded intermediate bit rate (IBR) file serves as the basis for other versions of the video asset. The encoded intermediate bit rate (IBR) file can include Nielsen watermarking that can be converted to ID3 metadata for use in the C3 and D4+ versions of the program. The advertising segments can be removed to create a D4+ version (i.e., another derivative file) of the program as well. The C3 and D4+ versions can include MPEG-2 HD and SD file formats as well as MPEG-4 HD and SD file formats.

As shown in FIG. 1, one example of the invention includes C3 encoding and distribution system 100 that includes distribution components, applications, and services that carry out the C3 distribution processes of the invention described in the diagrams of FIGS. 2-8. FIG. 1 illustrates the hardware and technical components used to instantiate the sources, apps, and distribution endpoints shown in FIGS. 2-8.

The system 100 includes Program Scheduling Application (PSA) 115. PSA 115 includes the schedule of video content to be encoded and distributed. As also shown in the persona diagram of FIG. 5, the system 100 determines which programming to provide to the non-linear distribution platforms in block 502. In block 506, the content provider schedules the video assets for distribution in the PSA 115. In block 510, the system 100 enters the start time/end time, network identifier, and additional video asset metadata to accompany the video asset to further the workflow. The PSA 115 validates the video assets and the metadata in block 514.

Returning to FIG. 1, the system 100 also includes catalog service 150 and frame grab service (FGS) 130. After the PSA 115 validates the video assets and metadata in block 514 of FIG. 5, the system 100 uses frame grab service 130 in block 518 to select an image(s), such as a thumbnail image(s), to associate with the video asset (video content). If an image for the video asset does not already exist, the system pulls an image from a frame grab service repository (not shown separately) to be associated with the video asset.

In blocks 522 and 526, respectively, the PSA 115 takes the video asset and the metadata (linear broadcast feed recording schedule, filename, thumbnail (poster) images locations, broadcast feed capture recording information, and broadcast feed network and routing information (and other artifacts used to identify linear broadcast feeds to be recorded and delivered to distribution partners as non-linear video assets for viewing on a variety of platforms) and performs a final confirmation of the asset, metadata (including record time, network identifier, and other metadata in block 530. After this check, the PSA 115 allows publishing of the asset in block 534. An operator uses the operator dashboard 155 to monitor the successful PSA publish activity. The PSA 115 publish activity is displayed in the operator dashboard 155 to confirm the success of the publishing operation. Publishing the asset occurs prior to the recording of the linear video broadcast to ensure successful preparation of the asset and to ensure timely delivery of the asset to third party video processing systems 180. If problems occur with the compilation and preparation of the asset, adequate lead time exists to correct any problems. In one example system of the invention, the PSA 115 publishes the asset two weeks prior to the recording of the linear video broadcast.

Once the system publishes the asset, the process continues toward distribution of the asset. In preparation for delivery, once the PSA 115 publishes the asset in block 534, the asset is ready for delivery (block 538), and the PSA 115 provides the video asset (manifest 117) to distribution service 120 as shown in FIG. 1. One example PSA 115 of the invention provides the manifest 117 using a REST call to/from distribution service 120.

Distribution service (DS) 120 is a service which processes the manifest 117 provided by the PSA 115 and modifies the manifest into a new manifest, which is a customized file, including a customized XML format (metadata file). The new manifest includes content, encoding, and distribution information for the specific programs (i.e., the specific linear broadcast feeds), the specific versions of the programs, the specific distribution partners, and the specific viewing platforms slated to receive the non-linear video content.

As shown in the example XML format metadata file in FIGS. 6A-6D, the customized XML metadata file is a based on the CableLabs Specification 1.1. It has been extended to support the invention by including the following tags:

"Recording Start Primary" 905 to identify the start time of the primary encode.

"Recording End Primary" 910 to identify the end time of the primary encode.

"Recording Start Alternate" 915 to identify the start time of the backup encode; in the event the first recording has a technical issue.

"Recording End Alternate" 920 to identify the end time of the backup encode.

"Recording Channel" 925 to identify the linear feed path (aka network, aka channel) to be encoded. The invention supports an N-tier model to record up to as many networks as the hardware infrastructure will allow.

The XML metadata file ("new manifest") shown in FIGS. 6A-6D includes video asset data such as the Asset identifier 930, show title 935, series name 940, episode name 945 and technical metadata such as the Run Time Value 950 of the content. The XML metadata file also references an image(s) (e.g., thumbnail image(s), poster image(s), etc.) associated with the video asset and the location of that image(s). The image reference 955 is in the XML within the "AMS Asset Class="poster"" and the XML metadata file supports multiple images, as well as the same image with different image formats, aspect ratios, and other attributes, including 1920× 1080, 800×1200, 273×410, 210×280, and 1440×1080 image formats. The images with different aspect ratios can be optimized depending upon the type of display device used. For example, the 1920×1080 image naming convention is "<Content Value="0256383_1930×1080.jpg"/>" 960.

The customized file can be many types of files including word processing documents, spreadsheet files, text files, HTML files, XML files, and other files that provide similar properties to the customized XML format. Distribution service 120 provides a new manifest 122 to enterprise distribution service 125. One example distribution service 120 of the invention provides the new manifest 122 using a REST call to/from enterprise distribution service 125.

The enterprise distribution service 125 communicates with messaging server 135 and receives event information 127 and other messages for use by other programs and services. These messages let the user know that the job is one of the following states; "Pending," "In Progress," "Complete". The user sees these status in the service operator dashboard 155.

The messaging server 135 can relay the events 127 to the enterprise distribution service 125 to give indication that the message was properly received. The messaging server 135 queues and prioritizes messages/events as needed and saves each of the other services from having to perform these tasks. Once the enterprise distribution service 125 receives the events and incorporates them into the asset materials, the enterprise distribution service 125 updates the catalog of assets using catalog service 150 and operator dashboard 155. After all the artifacts are created, the enterprise distribution service 125 then contacts file transfer service 140. The artifacts in the asset XML file include the (poster) image file(s) locations, the broadcast feed capture recording schedule, and the broadcast feed network information. The enterprise distribution service 125 can contact the file transfer service 140 using a SOAP call or other messaging protocol that allows processes running on disparate operating systems to communicate using a markup language, such as XML, for example, that allows invocation of web services and responses independent of language and platforms.

Once the file transfer service 140 receives the folder path addresses of the asset artifacts from the enterprise distribution service 125, the file transfer service 140 communicates with messaging server 135 to notify the messaging server 135 that the file transfer service 140 will begin delivery. The file transfer service 140 performs the actual delivery of the asset, metadata (e.g., XML file) and image to the third-party video processing services system 180. File transfer service 140 can use file acceleration modules 170, 171 that provide high-speed upload and download of large files and large data sets directly. For example, file acceleration transfer protocols, such as fasp and other transport protocols that eliminate bottlenecks in data transfers.

Figure 5:
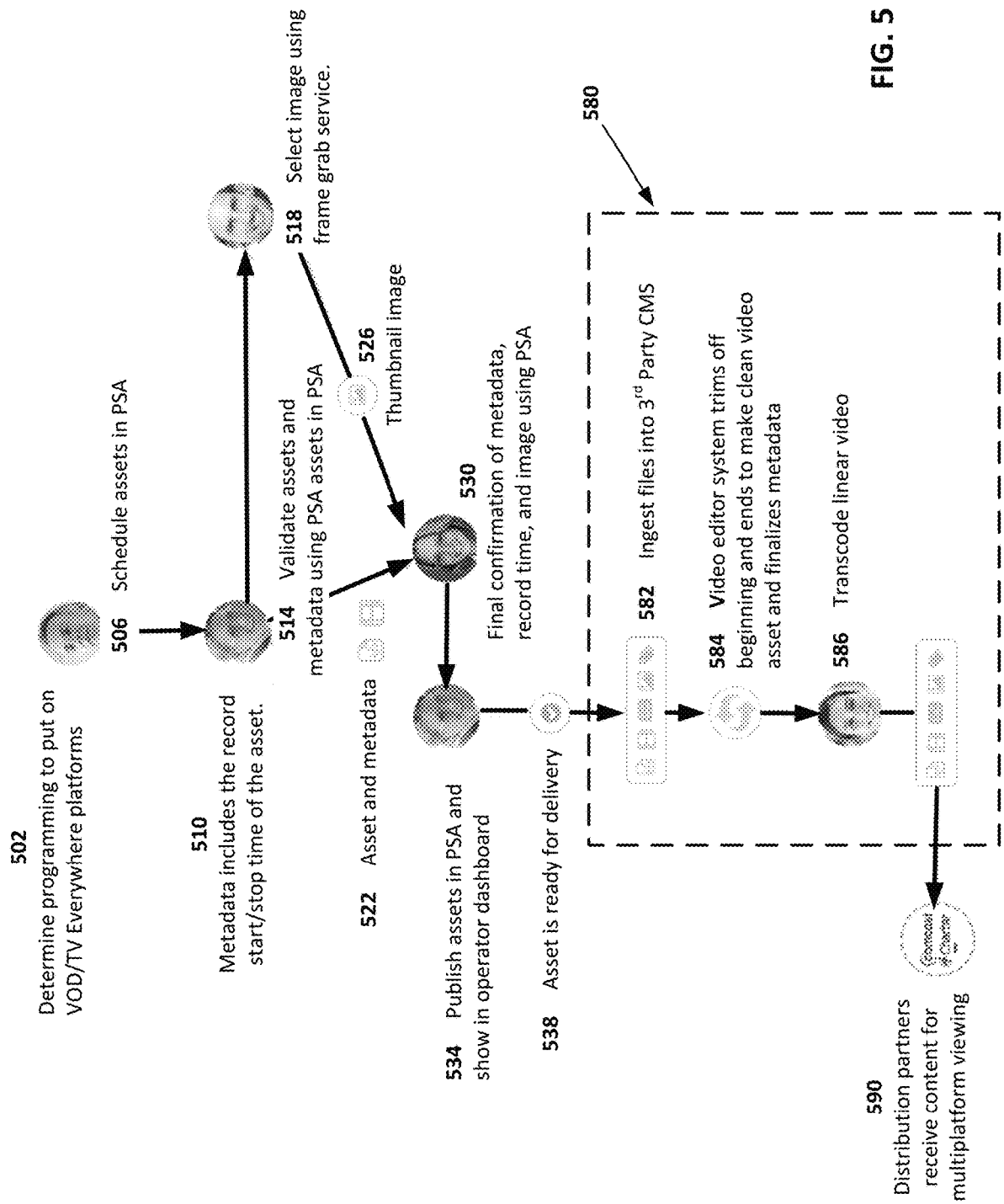
FIG. 5 shows a persona diagram of a C3 distribution system process of the invention.

Once the third-party video processing services system 180 (reference numeral 580 in FIG. 5) receives the asset artifacts (XML file, poster image file(s), broadcast feed capture recording schedule, and broadcast feed network information), a third-party content management system (CMS) 182 ingests those artifacts in preparation for distribution as also shown in block 582 of the persona diagram of FIG. 5. The CMS 182 publishes the asset, manages formatting, controls editing and versions, indexes the asset, and provides additional management services in preparation for consumption of the asset. The additional services can include video editing such as trimming of the video in block 584. The CMS 182 transcodes the ingested IBR files in block 586 to create non-linear video source files for distribution to the partners 590. The CMS 182 contacts additional messaging servers, such as a Java Message Service 184, that provides an application programming interface for sending messages between services. Service 184 provides JMS messaging to provide statuses of the state of the workflow. The message service 184 provides events 185 to online video platform service 160 in the host system 100. Online video platform service 160 provides an application programming interface wrapper for the events and provides a status update of the asset and files to catalog service 150 using operator dashboard 155. The online video platform service 160 also sends events 167 to messaging server 135 and provides an indication of the events 167 via operator dashboard 155 to indicate confirmation of data delivery to the OVP 186. The CMS 182 then distributes the modified/edited asset and files to distribution partners 190.

In addition, for further on-line distribution of the asset, the CMS 182 sends the modified/edited asset and accompanying files to on-line video platform 186. The online video platform 186 allows the third party video processing system 180 to upload, convert, store, video content on a network, such as the Internet, for example. Some online video platforms include measurement of quality of service and/or audience engagement. The online video platform 186 provides content for on-line systems as well as video on demand systems and live delivery. Some online video platforms 186 also provide embedded online video analytics providing insights into video performance, including total number of video views, impressions, unique views, watch times, user location statistics, and user behavior.

The online video platform 186 communicates with online video platform service 160 in the content provider system 110 to provide further status updates of the asset and files to catalog service 150. The online video platform service 160 also sends wrapped events 167 to messaging server 135 indicating success or failure of delivery of the customized video assets and files to OVP 186 and provides an indication of the events 167 via operator dashboard 155 as related to the online video platform 186. Once the online video platform 186 provides the updates to the content provider system 110, the online video platform 186 delivers the customized assets and files to branded websites 195.

Figure 2:
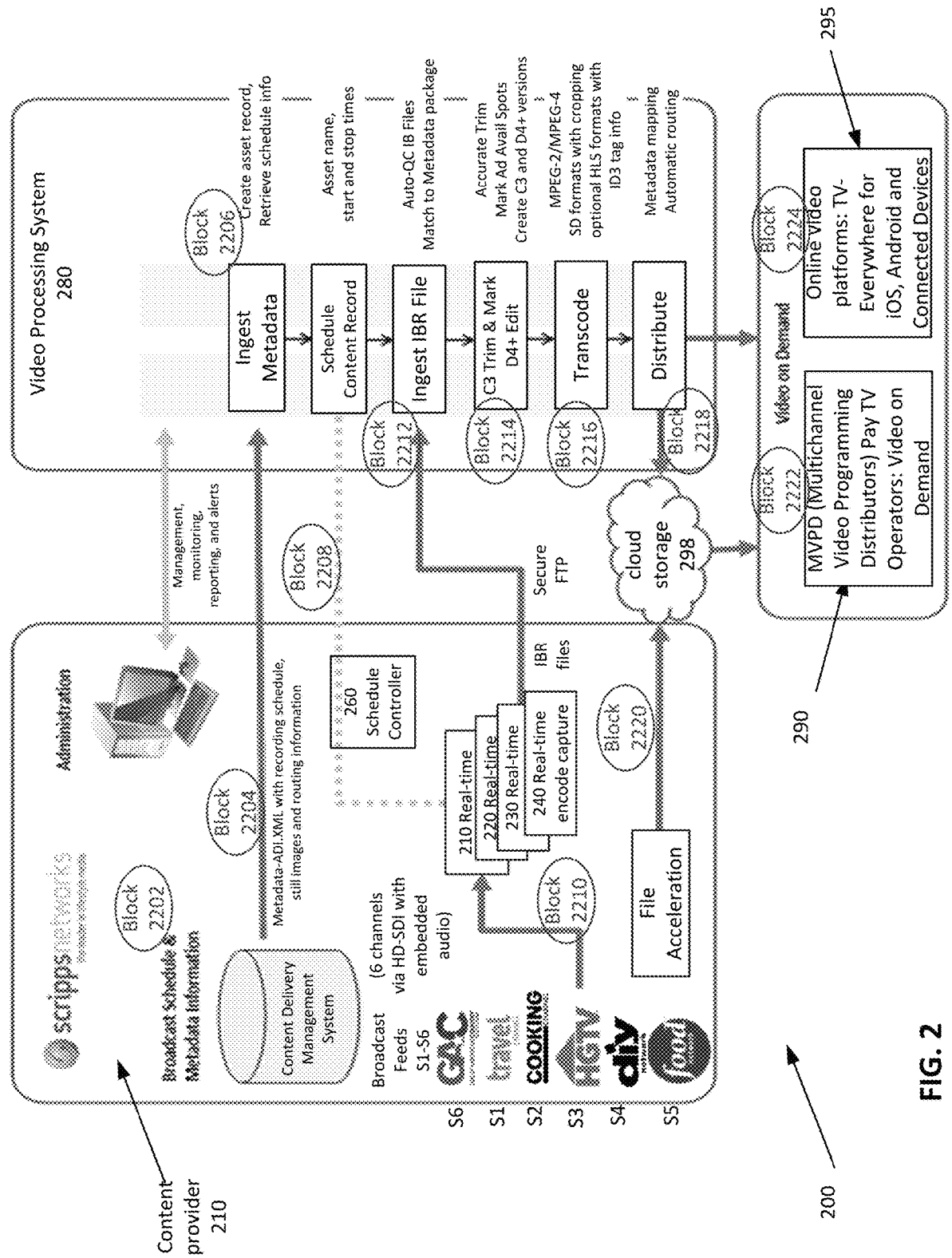
FIG. 2 shows an end-to-end workflow from a content provider to a video processing system to a Multichannel Video Programming Distributor (MVPD) and an on-line video platform, including delivery of an IBR (Intermediate Bitrate, a.k.a. "mezzanine") video file) transfer from within the system of the invention to a third-party video processing services system.

FIG. 2 provides an overview of the workflow for creation of the nonlinear content in the end-to-end system 200 that includes content provider 210, (third-party) video processing system 280, and video-on-demand platforms (MVPDs 290 and online video platforms 295). The workflow generally moves from the content-provider 210 to the third party video processing system 280 for distribution to the content-provider's partners and properties (MVPDs 290 and online video platforms 295).

FIG. 2 details the intermediate bitrate (IBR) video file transfer from the content provider 210 to the third-party video processing services system 280. As outlined above, the intermediate bit rate (IBR) file serves as the basis for other versions of the video asset. As shown in block 2202, the transfer and process begins when the content provider 210 selects video assets (e.g., programs, shows, clips, etc.) to be encoded. The video assets are entered into the Program Scheduling App (PSA 115 in FIG. 1) schedule.

In block 2204, the scheduled assets are published from PSA 115 and are delivered to 3$^{rd}$ party vendor system 280. In block 2206, the video assets are ingested in to the 3$^{rd}$ Party content management system (CMS 182 in FIG. 1).

In block 2208, the system schedules encoding of the video assets from the sources S1-S6. The system sends the time of the encoding to an encoding controller server 260. In block 2210, encoding executes. At the time of the assets' linear broadcast airdate, encoding servers (210-240) perform the encoding of the video assets S1-S6. The system creates an intermediate bitrate (IBR) video file of each of the video assets S1-S6.

In block 2212, the system moves the IBR video files to the 3$^{rd}$ party video processing system 280, where they are ingested. In block 2214, the system trims the video file (see FIGS. 7 and 8 for additional details) to create clean start/stop positions and finalizes technical metadata.

In block 2216, the system transcodes the video. The new source video is transcoded into different formats for delivery to distribution partners. In block 2218, the system distributes the video. Capitalizing on the workflow of the invention, the system provides simultaneous distribution of the video to multiple endpoints (distributors). The video can be stored (such as in cloud storage 298 prior to delivering the video to the MVPDs (see block 2222 below).

In block 2220, the system determines if additional video files (that do not need C3 encoding) will be sent to the video on demand distributors 290, 295. If there are video files that do not need C3 encoding, those files are sent directly to the distributors (without ingestion or encoding by the 3$^{rd}$ party video processing system 280.

In block 2222, the system delivers the transcoded video files to the multichannel video programming distributors 290, and in block 2224, the system delivers the transcoded video files to the online video platforms, such as over-the-top (OTT) content providers and to owned-and-operated (O&O) websites and apps.

Figure 3:
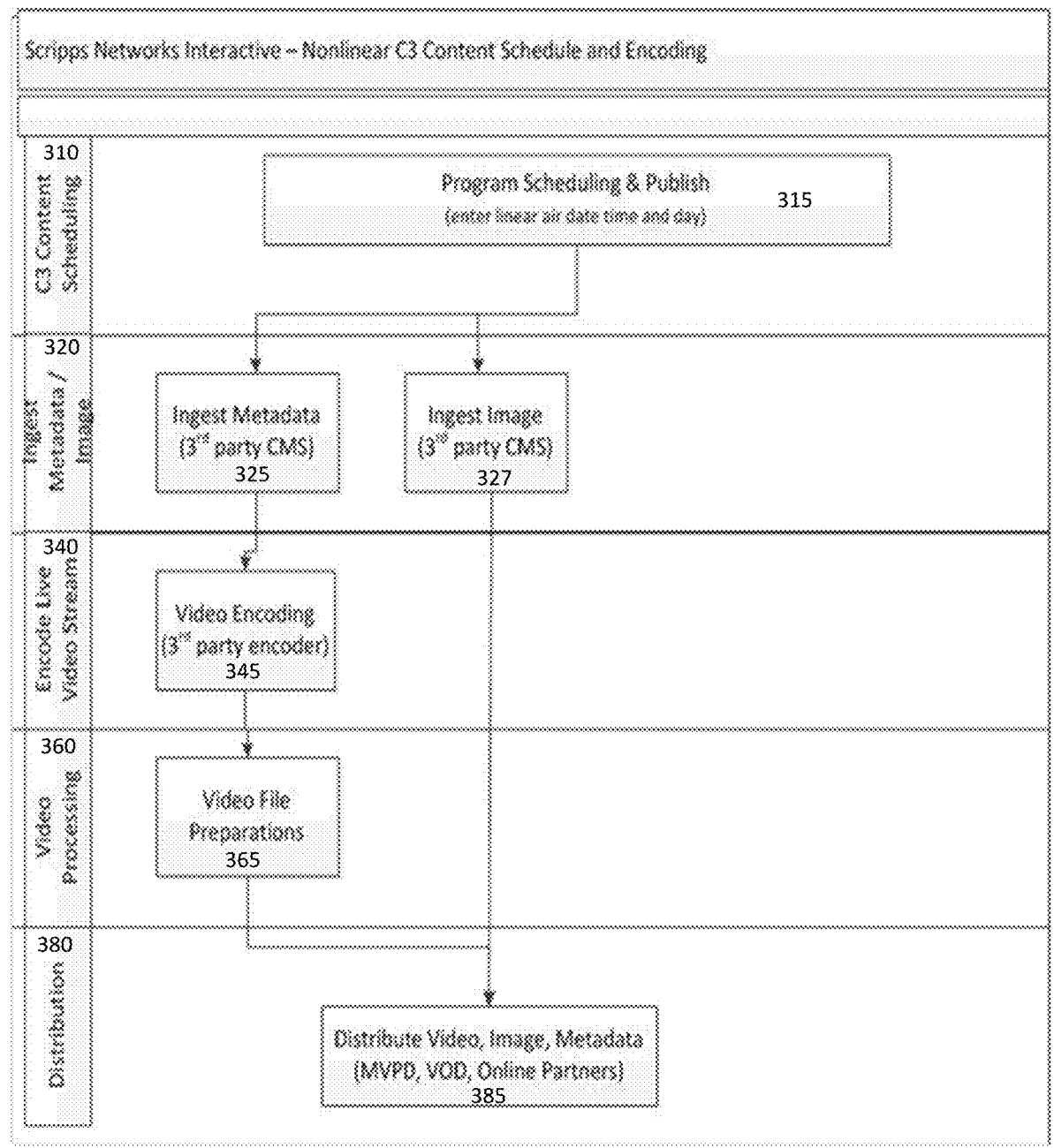
FIG. 3 shows a swim lane diagram of a C3 distribution system process of the invention.

The swim-lane diagram of FIG. 3 provides another and different lens with which to view the technical solutions to the problems addressed by the invention. FIG. 3 shows a process flow diagram that outlines the steps, job sharing, and responsibilities to schedule and encode the C3 content in accordance with the claimed invention and in the context of FIG. 2.

In block 310, the process begins with selection and scheduling of the C3 content. The content-provider programming staff determines which episodes each week will be distributed on "next day" non-linear video-on-demand (VOD) and TV-Everywhere.

In block 315, multiplatform operations schedule the episode in the PSA (Program Scheduling Application).

Also in block 315, multiplatform operations staff publishes that schedule information and delivers it to the third-party video processing services. The delivery is an XML file and image. The XML contains the episode name, description, network, and the air time and date. The schedule is delivered in advance of the video broadcast, so the third-party video processing services will know which episode name, description, network and the air time and date to capture.

In block 320, the system 100 ingests the video content (xml file). For example, in block 325, the third-party video processing services 180 ingests the XML file and in block 327, the third-party video processing services ingests the image into their CMS system 182.

In block 340, the system encodes the live video stream. At the specified day and time and network and episode name and description, in block 345, the third-party video processing services initiates the video encoding (recording) via computer servers located at the content-provider's broadcast operations center.

Upon completion of the episode encoding (for example, an episode could be shown from 9:00 PM EST-9:30 PM EST), the recorded video file is sent to the third-party video processing services in block 360.

Once the third party video processing system 180 receives the video file, in block 365, the third-party video processing system 180 performs video file preparations, including cleanup of the file such as trimming off any extra seconds of content encoded (recorded), such as adjacent programming and advertising before and after the recorded program. The third-party video processing system 180 also adds new metadata such as the in/out time codes for the advertising breaks. They also create a "D4 video asset" which is a version of the video file without advertisements. These versions (a.k.a. "derivative files") are used after the 3 day window when the distributor can no longer collect advertising revenue for the video.

Block 380 shows the distribution of the C3 and D4+ video file. That is, in block 385, the third-party video processing services 180 (typically by 6 AM the next morning) completes distribution of the video file to the content-provider's multichannel video programming distributors 190 (such as Comcast, Time Warner Cable, Charter, etc.). The video file is also delivered to an OVP 186 (online video platform), which is the video management system for the content-provider-owned-and-operated TV-Everywhere sites and applications. Typically, the video file delivered to the OVP 186 is higher resolution video content than that of the broadcast.

Figure 4:
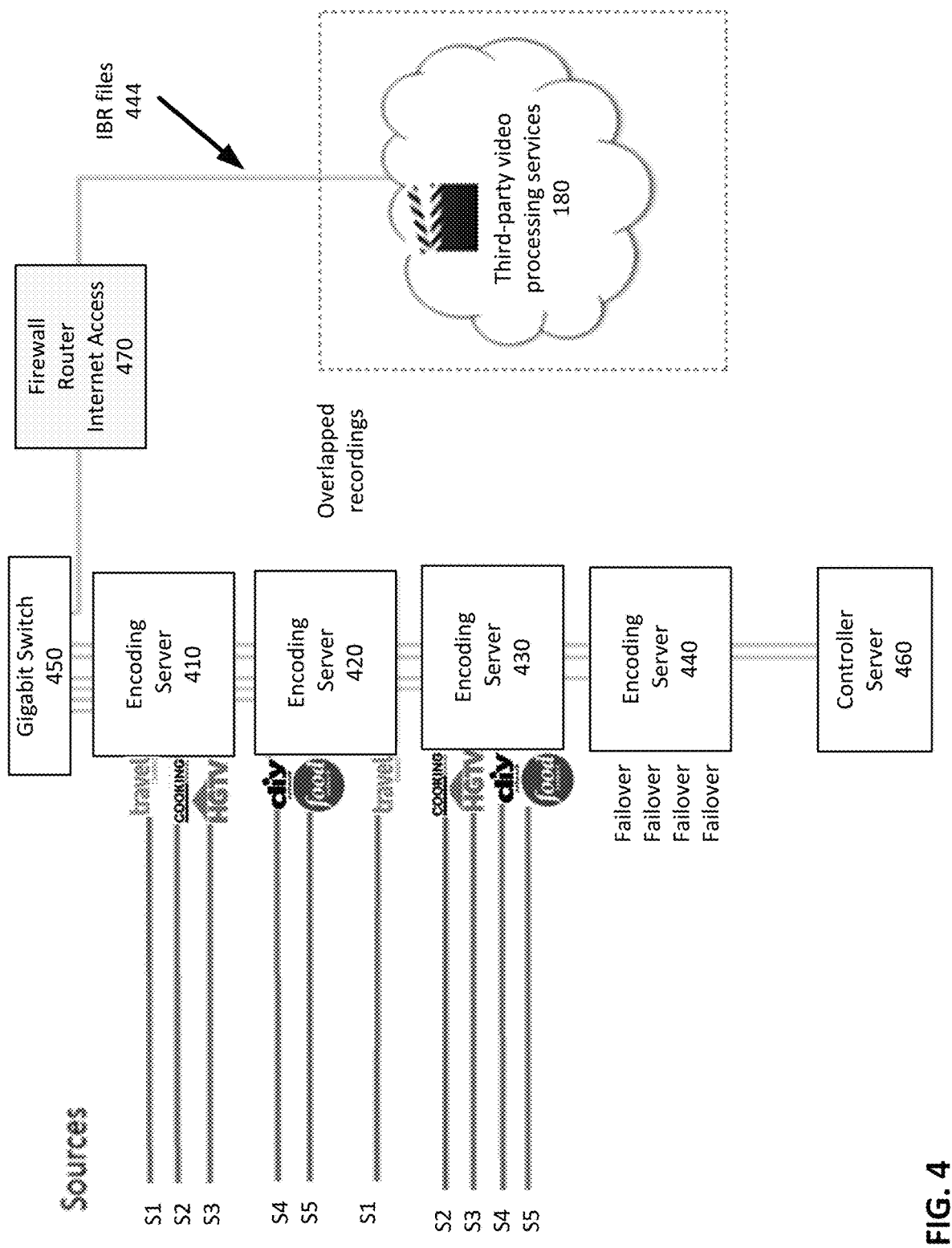
FIG. 4 shows additional detail of an example simultaneous creation of IBR files (from FIG. 2) from multiple content sources via the encoding servers, which then move the IBR files to a third party video processing services system.

As shown in FIG. 1 and in detail in FIG. 4, the system 100 provides output to the third-party video processing service 180 for encoding, editing, and distribution. While FIG. 1 shows a single output from enterprise distribution service 125 to file transfer service 140, the system 110 can simultaneously provide more than one content source for distribution. FIG. 4 shows multiple content sources sending content simultaneously. For example, five distinct network sources S1-S5 can provide content for encoding. The third-party video processing services encoding system receives overlapped recordings of the multiple sources S1-S5 and failover to additional real time encoder and capture units (encoding servers 410, 420, 430, 440). Feeds are moved from a failed encoder to a warm spare encoder if the primary encoder fails.

Video processing components, capture and encode the content from the sources S1-S5. The content provider system 110 utilizes a controller server 460, to create the initial captured IBR (intermedia bit rate) video files at 30 Mbps. The controller server 460 receives a linear video asset identifier, an encoding start time, and an encoding stop time to control the encoding of the broadcast feeds S1-S5. Once the system 110 captures and encodes the files 444, they are uploaded through a switch 450 and through any firewalls and/or routers (such as firewall router 470 in FIG. 4) using a secure FTP to the third-party video processing system 180 for further processing. (See also blocks 2210 and 2212 in FIG. 2.) Additionally, the system can rout the files 444 through file accelerators 170, 171, as shown in FIG. 1. The ingested intermediate bit rate (IBR) file serves as the basis for the other versions of the video asset.

Manual Review and Trimming Work Flow

In many video assets (e.g., programs), some footage may need to be discarded to conform to start and stop and length time requirements or to remove imperfect or unwanted footage.

Figure 7:
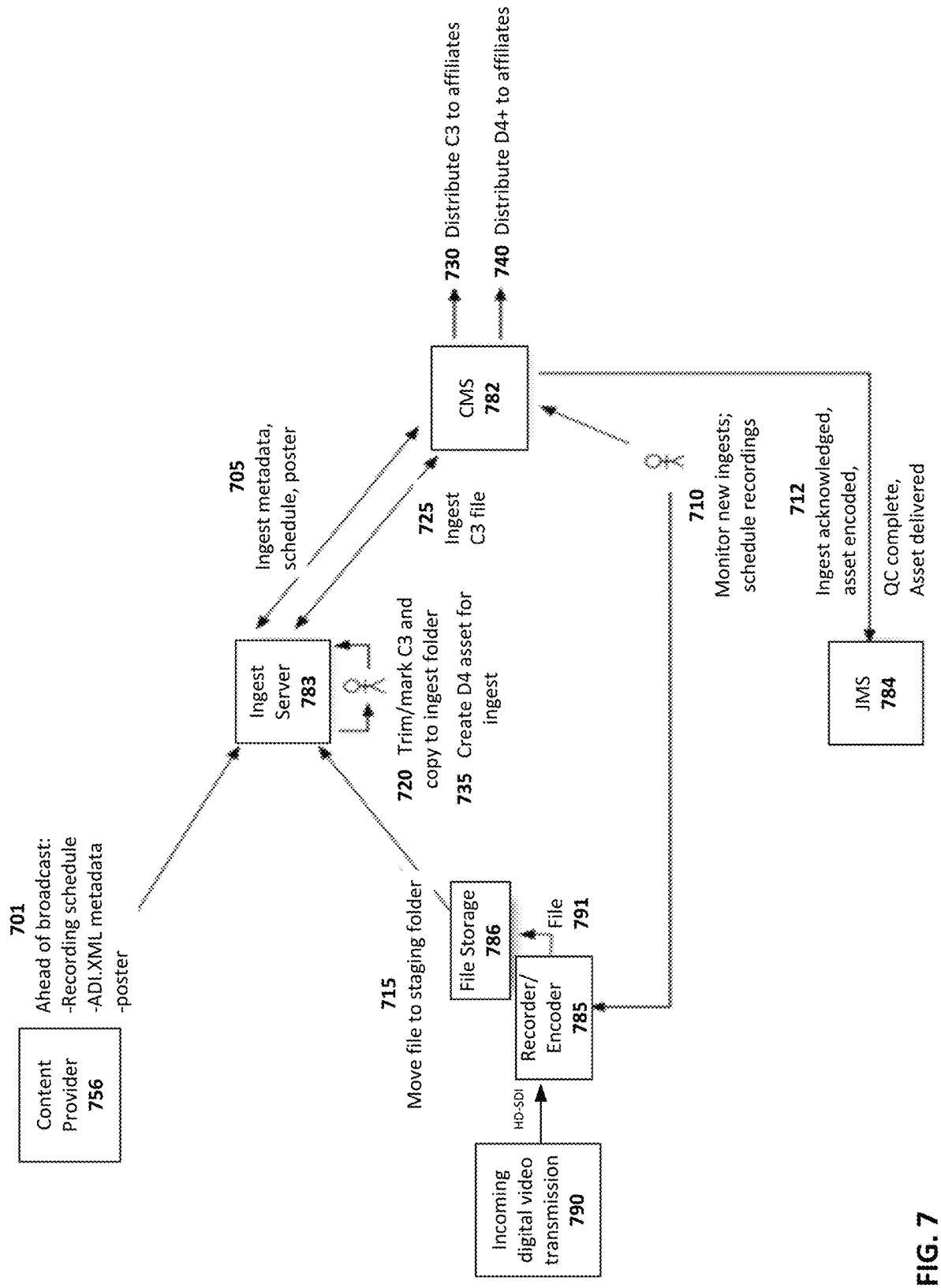
FIG. 7 shows additional detail of an example workflow process of FIG. 2 focusing on the preparation of a video file for distribution in accordance with the invention.

FIG. 7 shows the workflow process to prepare the video file for distribution to C3 distributors (affiliates) and D4+ distributors (affiliates). Prior to air time of the video content (e.g., such as 24 hours before air time), in block 701, the content provider 756 delivers the recording schedule, the XML metadata file for the shows in the schedule, and poster images (such as thumbnail images) for the shows in the schedule to the ingest server 783 of the third party video processing services provider 180. This advance notification allows the third party video processing services provider time to receive a notification that a show needs to be recorded, schedule the recording, and then verify recording schedule shortly before air time.

The recording schedule, metadata, and poster images provide information about the video asset, but the asset package (video recording, schedule, metadata, and image) remains incomplete until the system adds the video recording. In the meantime, the partial packages are prepared and stored in a drop folder that the third party video processing services provider can access. For example, if the content provider's primary drop folder is "contentprovider/", a package might be dropped in "contentprovider/package1/":

contentprovider/package1/ADI.XML
contentprovider/package1/poster.bmp

The process continues in block 705 where the CMS 782 of the third party video processing services platform ingests the partial package (metadata, including the scheduling information, and poster image(s), from the ingest server 783, creates an asset in the media library, and notifies their professional services personnel that a new recording needs to be scheduled. The asset will remain in the incomplete state until the recorded file is added to the package directory with the correct filename (later in the process at block 720). At that point, the third party video processing services platform will finish ingesting the package, and the directory will be removed.

In block 710, the third party video processing services professionals receive a notification, review the schedule information, and schedule the recording on an encoder. The third party video processing services group uses file storage server 786 as a secure gateway to reach the encoder 785. Access to the file storage server 786 is only allowed from the third party video processing services' production networks. Shortly before air time, the third party video processing services professionals connect to the encoders 785 and verify the recording schedules.

In block 715, the encoder 785 records the incoming digital video transmission 790 (i.e., program) and writes the file 791 to the file storage server 786. In block 715, the file storage server 786 copies the file 791 up to a staging directory on the ingest server 783.

In block 720, the third party video processing services professionals trim the recording to the correct start and stop points and mark the ads. Then the trimmed video asset is moved into the package ingest directory from block 701.

In block 725, the third party video processing services platform (CMS 782) ingests the trimmed and marked file, then cleans up the package directory. The asset package then goes through the rest of the third party video processing services' workflow. In parallel with block 725 (and in parallel with block 730 below), third party video processing services professionals edit the file for D4+ content in block 735, and create the D4+ asset in the third party video processing services platform (CMS 782).

Once the third party video processing services workflow is complete, in block 730, the asset package (C3 asset) is distributed to affiliates, along with affiliate-specific metadata and poster image(s). The D4+ package also goes through the third party video processing services workflow and is distributed to affiliates (in block 740), along with affiliate-specific metadata and poster image(s). When CMS 782 acknowledges ingest of the encoded asset, completes quality assurance measures to ensure the C3 and D4+ assets are correct, and verifies delivery of the asset package, CMS 782 updates JMS 784, which can provides events to online video platform service in the host system 100.

Automated Review and Trimming Work Flow

Figure 8:
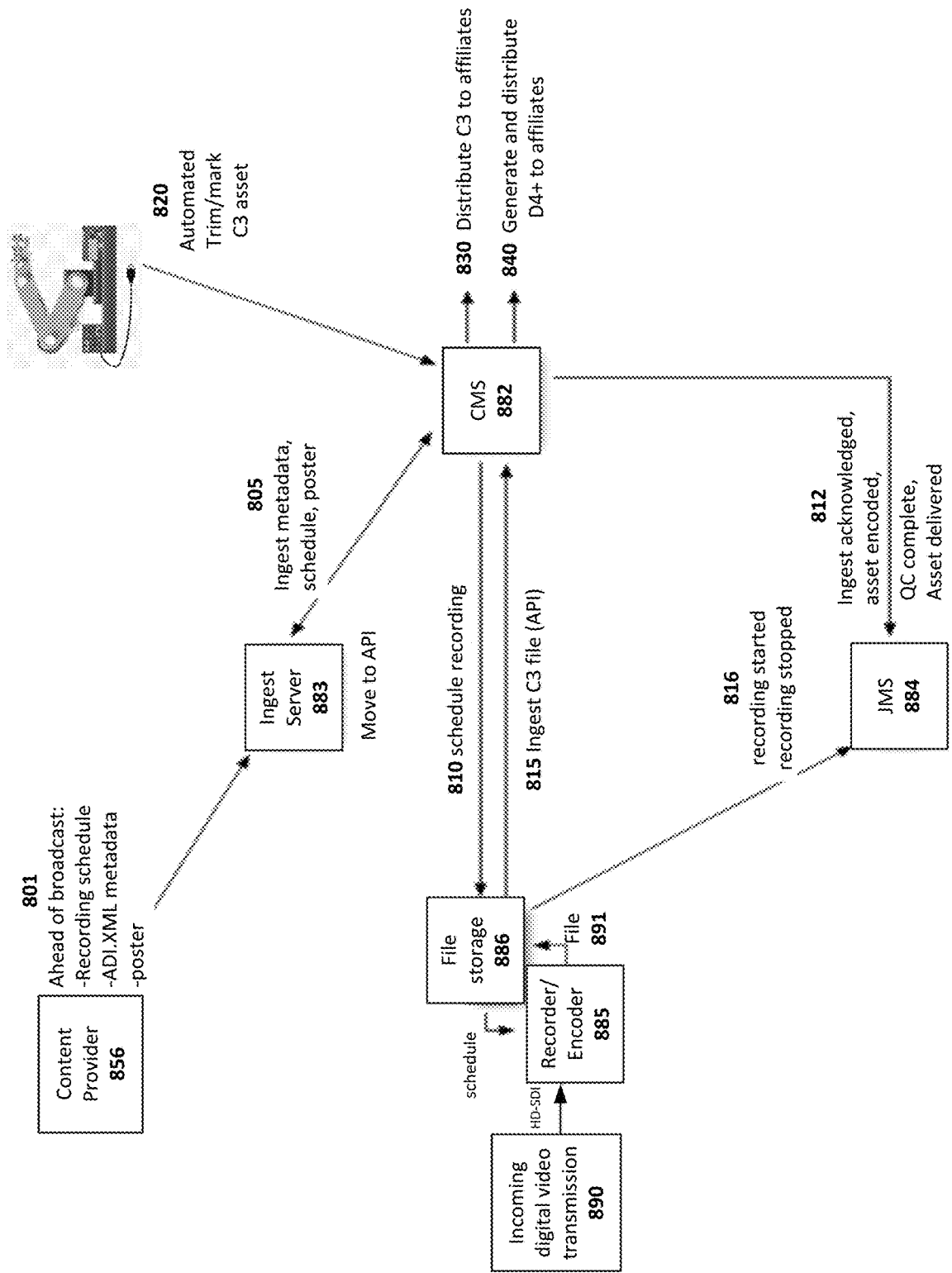
FIG. 8 shows additional detail of an alternative example workflow process of FIG. 2 focusing on an alternative preparation of a video file for distribution that includes an automated trimming and marking facility.

FIG. 8 shows an alternative review and trimming workflow to prepare the video file for distribution to C3 distributors (affiliates) and D4+ distributors (affiliates) using an automated trimming and marking facility. For example, in block 801, prior to air time, the content provider 856 delivers the recording schedule, the ADI.XML metadata for the shows in the schedule, and poster images (such as thumbnail images) for the shows in the schedule to the ingest server 883 of the third party video processing services provider 180. This allows the third party video processing services provider 180 time to process the package and scheduling data, schedule the encoders, and provide notification if any issues arise.

As outlined above, the recording schedule, metadata, and poster images provide information about the video asset, but the asset package (e.g., video recording, schedule, metadata, and image) remains incomplete until the system adds the video recording. In the meantime, the process continues in block 805 where the third party video processing services platform ingests the partial package (e.g., metadata, scheduling information, and poster image(s)) from the ingest server 883, creates an asset in the media library, and schedules a new recording. The asset will remain in the incomplete state until the recorded file is added to the package directory with the correct filename (later in the process at block 815). At that point, the third party video processing services platform will finish ingesting the package.

In block 810, the third party video processing services professionals automatically notifies the file storage server 886 to schedule the recording based on the information ingested in block 805. The file storage server 886 then schedules the recording on a specific encoder 885.

In block 815, the encoder 885 records the incoming digital video transmission 890 (i.e., program) and writes the file 891 to the file storage server 886. In block 816, the file storage server 886 provides updates to Java Message Service 884 regarding stopping and starting of the recording. Also in block 815, the file storage server 886 then adds the file to the associated asset in the third party video processing services platform (CMS 882).

In block 820, the third party video processing services professionals trim the recording to the correct start and stop points and mark the ads. Alternatively, the trimming and marking is performed automatically by the third party video processing services video processors when the content provider 856 provides automated editing functionality codes in the files.

The asset package (C3 asset) then goes through the rest of the third party video processing services' workflow and is distributed to affiliates along with affiliate-specific metadata and poster image(s) in block 830.

In block 840, the D4+ asset is generated automatically based on the video markers, is routed through the third party video processing services workflow and is distributed to affiliates (in block 840), along with affiliate-specific metadata and poster image(s). When CMS 782 acknowledges ingest of the encoded asset, completes quality assurance measures to ensure the C3 and D4+ assets are correct, and verifies delivery of the asset package, CMS 782 updates JMS 884, which can provides events to online video platform service in the host system 100.

The claimed invention provides a video encoding (recording) system that includes content-provider scheduling and broadcast programming for encoding, editing, and distribution by a third-party of the content provider's video assets. The video assets can be episodes of shows, for example. The content provider prepares the video assets to include markers and additional features that enable the received video assets (received as source video files) to be edited and prepared by the third party for distribution to the content-provider's partners and properties. The third party video processing services provider edits and enriches the source video files and provides the derivative video files as C3 and D4+ content to the partners and properties. The video scheduling and encoding system provides C3 and D4+ content with technical specifications that are used downstream to generate advertising revenue.

The invention also incorporates promotional graphics on VOD content and integrates automated channel branding tools, which allows insertion of branding graphics into VOD files using automated versioning. This allows broadcasters to strengthen their brand promotion across multiple platforms. Broadcasters can drive audiences to linear channels where their revenue is generally concentrated, and by the streamlined workflow of the invention for VOD publishing, broadcasters create on-demand content much more efficiently. Broadcasters can now quickly repurpose their playout schedule and content to create all of their VOD deliverables, including customized XML metadata files and IBR H.264 files, as well as high quality masters for premium content portals, such as MVPDs and content provider-owned mobile apps. The premium portals can receive and distribute clean video assets (i.e., without advertisements), high quality assets with reduced advertisement loads, and/or high quality assets with full advertisement loads.

We claim:

1. A non-linear video content scheduling and encoding system comprising:
    a program scheduling application, including instructions stored on a non-transitory computer-readable medium executed on a content provider server that creates a manifest that includes a broadcast feed recording schedule, a filename of a scheduled broadcast feed, a still image location, broadcast feed capture information, and network routing information of a linear broadcast feed;
    a distribution service that processes the manifest provided by the program scheduling application and transforms the manifest into a new manifest that includes customized metadata files specific to a distribution partner and sends the new manifest to an ingest server in a video processing system;
    a schedule controller server that receives a linear video asset identifier, a start time of encoding the linear broadcast feed, and a stop time of stopping the encoding of the linear broadcast feed from the video processing system; and
    an encoding server that receives the linear broadcast feed and encodes the linear broadcast feed into an intermediate bit rate file and sends the intermediate bit rate file to the video processing system as non-linear video content;
    wherein the intermediate bit rate file includes technical specifications used to view the non-linear video content on multiple viewing platforms.

2. A non-linear content scheduling and encoding system of claim 1, wherein the multiple viewing platforms used to view the non-linear video content include at least one of a multichannel video programming distributor (MVPD) and an online video platform.

3. A non-linear content scheduling and encoding system of claim 1 further comprising:
an audience measurement unit that counts viewers of C3 non-linear video content prepared from the intermediate bitrate file sent to the video processing system.

4. A non-linear content scheduling and encoding system of claim 1, wherein the intermediate bit rate file includes watermarking to denote advertising insertion points of C3 non-linear video content prepared from the intermediate bitrate file sent to the video processing system.

5. A non-linear content scheduling and encoding system of claim 4, wherein the watermarking includes an audio watermark.

6. A non-linear content scheduling and encoding system of claim 1,
wherein the program scheduling unit creates manifests for multiple linear broadcast feeds and sends the manifests of the multiple linear broadcast feeds to the ingest server in the video processing system; and
wherein the schedule controller server receives multiple linear video asset identifiers, start times of encoding multiple linear broadcast feeds, and stop times of stopping the encoding of the multiple linear broadcast feeds from the video processing system; and
wherein the encoding server receives the multiple linear broadcast feeds and encodes the multiple linear broadcast feeds to respective intermediate bit rate files and send the respective intermediate bit rate files to the video processing system.

7. A non-linear content scheduling and encoding system of claim 6, wherein the manifests are metadata files that include a broadcast feed recording schedule, a filename of a scheduled broadcast feed, a still image location, broadcast feed capture information, and network routing information of a linear broadcast feed.

8. A non-linear content scheduling and encoding system of claim 1, wherein the intermediate bit rate file includes at least one of closed captioning data, advertisements, still images, and packaged content.

9. A non-linear content scheduling and encoding system of claim 1, wherein the manifest is an XML metadata file.

10. A non-linear content scheduling and encoding system of claim 1 further comprising:
a frame grab service that selects the still image used in creating the metadata file.

11. A non-linear content scheduling and encoding system of claim 1, wherein the program scheduling application unit publishes the manifest prior to encoding of the linear video broadcast.

12. A non-linear content scheduling and encoding system of claim 1 further comprising:
a messaging server that provides a status of the scheduling and encoding of the linear video asset to an enterprise distribution service and displays the status in an operator dashboard.

13. A non-linear content scheduling and encoding system of claim 1 further comprising:
an enterprise distribution server that receives customized metadata files, retrieves a still image based on the still image location, transforms the image based upon the multiple viewing platforms, and provides the encoded linear broadcast feed to a file transfer service for distribution.

14. A non-linear content scheduling and encoding system of claim 1 further comprising:
a file transfer server that receives the manifest from the program scheduling application and transfers the manifest and still images to the video processing system to match up with the intermediate bit rate file later sent to the video processing system by the encoding server.

15. A non-linear content scheduling and encoding system of claim 1 further comprising:
an ingest server that receives the manifest and schedules the encoding of the linear broadcast feed.

16. A non-linear content scheduling and encoding system of claim 1 further comprising:
an ingest server that receives the intermediate bit rate file and trims the intermediate bit rate file to correct start and stop times.

17. A non-linear content scheduling and encoding system of claim 1 further comprising:
an ingest server that receives the intermediate bit rate file and creates a C3 non-linear video asset.

18. A non-linear content scheduling and encoding system of claim 17, wherein the ingest server receives the manifest and creates the C3 version of the non-linear video asset based on the manifest and the intermediate bit rate file.

19. A non-linear content scheduling and encoding system of claim 1 further comprising:
an ingest server that receives the intermediate bit rate file and creates a D4+ non-linear video asset.

20. A non-linear content scheduling and encoding system of claim 19, wherein the ingest server receives the manifest and creates the D4+ version of the non-linear video asset and metadata in the manifest provides a basis for insertion of at least one of advertisements and branding information in the D4+ version of the non-linear video asset.

21. A non-linear content scheduling and encoding system of claim 1 further comprising:
an online video platform service that receives confirmation of delivery of at least one of a C3 version of the non-linear video asset to a viewing platform and a D4+ version of the non-linear video asset to a viewing platform.

22. A non-linear content scheduling and encoding system of claim 1, wherein the video processing system includes a content management system (CMS) that receives a single manifest with a single set of artifacts and transforms the single set of artifacts into a plurality of sets of artifacts using a one-to-many conversion.

23. A non-linear content scheduling and encoding system of claim 22, wherein the video processing system further distributes each of the plurality of artifacts to individual distribution partners based upon the one-to-many conversion.

* * * * *